(12) United States Patent
Lee et al.

(10) Patent No.: US 10,523,093 B2
(45) Date of Patent: Dec. 31, 2019

(54) RESOLVER

(71) Applicant: LS AUTOMOTIVE TECHNOLOGIES CO., LTD., Gyeonggi-Do (KR)

(72) Inventors: Won-Yong Lee, Seoul (KR); Byung-Cheol Na, Gyeonggi-Do (KR); Da-Hee Sim, Gyeonggi-do (KR); Seong-Wook Lee, Gyeonggi-do (KR); Yeon-Muk Choi, Gyeonggi-do (KR)

(73) Assignee: LS AUTOMOTIVE TECHNOLOGIES CO., LTD., Gyeonggi-do (KR)

( * ) Notice: Subject to any disclaimer, the term of this patent is extended or adjusted under 35 U.S.C. 154(b) by 43 days.

(21) Appl. No.: 15/771,051

(22) PCT Filed: Dec. 29, 2015

(86) PCT No.: PCT/KR2015/014439
§ 371 (c)(1),
(2) Date: Apr. 25, 2018

(87) PCT Pub. No.: WO2017/082466
PCT Pub. Date: May 18, 2017

(65) Prior Publication Data
US 2019/0058376 A1 Feb. 21, 2019

(30) Foreign Application Priority Data
Nov. 9, 2015 (KR) .................. 10-2015-0156739

(51) Int. Cl.
*H02K 11/21* (2016.01)
*H02K 11/225* (2016.01)
(Continued)

(52) U.S. Cl.
CPC ............. *H02K 11/225* (2016.01); *G01B 7/30* (2013.01); *G01D 5/2046* (2013.01); *H02K 1/146* (2013.01);
(Continued)

(58) Field of Classification Search
CPC ........ H02K 11/225; H02K 1/14; H02K 24/00; H02K 1/146; H02K 1/278; H02K 11/00;
(Continued)

(56) References Cited

U.S. PATENT DOCUMENTS 4,467,973 A * 8/1984 Iwata .................. H02K 15/105
156/425
2005/0023921 A1 2/2005 Kobayashi et al.
(Continued)

FOREIGN PATENT DOCUMENTS

JP 1996-178611 A 7/1996
JP 2005-49183 A 2/2005
(Continued)

OTHER PUBLICATIONS

JP-2012117862-A—EPO machine translation, 2012, all pages, Watanabe. (Year: 2012).*
(Continued)

*Primary Examiner* — Naishadh N Desai
(74) *Attorney, Agent, or Firm* — Harness, Dickey & Pierce, P.L.C.

(57) ABSTRACT

Disclosed is a resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein a thickness (tr) of the rotor and a thickness (ts) of the stator satisfies the equation: tr−ts≥0.7 [mm], thereby efficiently offsetting an influence caused by an
(Continued)

assembly error, which is commonly generated when assembling a resolver, improving the measurement precision, facilitating a resolver designing work and reducing manufacture costs.

8 Claims, 16 Drawing Sheets

(51) Int. Cl.
| | |
|---|---|
| G01D 5/20 | (2006.01) |
| H02K 1/14 | (2006.01) |
| G01B 7/30 | (2006.01) |
| H02K 11/00 | (2016.01) |
| H02K 1/27 | (2006.01) |
| H02K 1/24 | (2006.01) |
| H02K 24/00 | (2006.01) |

(52) U.S. Cl.
CPC ............. *H02K 1/246* (2013.01); *H02K 1/278* (2013.01); *H02K 11/00* (2013.01); *H02K 24/00* (2013.01); *H02K 2213/03* (2013.01)

(58) Field of Classification Search
CPC ...... H02K 1/246; H02K 2213/03; G01D 5/20; G01D 5/2046; G01B 7/30
See application file for complete search history.

(56) References Cited

U.S. PATENT DOCUMENTS

| | | | | |
|---|---|---|---|---|
| 2005/0121987 A1* | 6/2005 | Ritzinger | ............... | H02K 5/128 |
| | | | | 310/68 B |
| 2006/0226719 A1* | 10/2006 | Nakanishi | ................ | H02K 7/20 |
| | | | | 310/68 B |
| 2007/0273241 A1 | 11/2007 | Niguchi et al. | | |
| 2013/0093294 A1* | 4/2013 | Jang | ........................ | H01F 38/18 |
| | | | | 310/68 B |
| 2017/0211949 A1* | 7/2017 | Hoener | ................ | G01D 5/2073 |

FOREIGN PATENT DOCUMENTS

| | | | |
|---|---|---|---|
| JP | 2012-117862 A | | 6/2012 |
| JP | 2012117862 A | * | 6/2012 |
| JP | 2014-054154 A | | 3/2014 |
| KR | 2015-0042938 A | | 4/2015 |

OTHER PUBLICATIONS

International Search Report dated Aug. 9, 2016, issued in International Application No. PCT/KR2015/014439, with English Translation.

* cited by examiner

RESOLVER

CROSS-REFERENCE TO RELATED APPLICATIONS

This application is a national phase application of PCT Application No. PCT/KR2015/014439, filed on Dec. 29, 2015, which claims the benefit and priority to Korean Patent Application No. 10-2015-0156739, filed Nov. 9, 2015. The entire disclosures of the applications identified in this paragraph are incorporated herein by references.

FIELD

The present disclosure relates to a resolver, and more particularly, to a resolver for measuring a rotation angle and a rotation speed of a rotating device such as a motor.

BACKGROUND

Generally, a resolver is a kind of sensor for measuring a rotation angle and a rotation speed of a rotating device such as a motor. Recently, the resolver is widely used in various technical fields, particularly to a high-precision control system such as an electric power steering system which demands measurement and control of a rotation angle and a rotation speed with high precision. Therefore, it is needed to accurately figure out and analyze various factors giving an influence on the measurement performance of the resolver and reflect these factors on the design of the resolver in order to minimize a measurement error of the resolver and improve the measurement precision to the maximum.

However, in existing techniques, it is just intended to improve the measurement performance by changing configurations of an excitation coil and an output coil disposed at a stator of a resolver as disclosed in Japanese Unexamined Patent Publication No. 1996-178611, or it is just intended to improve the measurement performance by changing a shape of a rotor of a resolver as disclosed in Japanese Unexamined Patent Publication No. 2005-49183, so an assembly error between the stator and the rotor, which is generated commonly when assembling a resolver, is not considered as a factor giving an influence on the measurement performance of the resolver. In other words, when a resolver is assembled, if an offset error causing a height difference between the stator and the rotor in a direction of a rotary shaft or a twist angle error causing the rotary shaft of the rotor to be inclined with respect to the stator is generated, the magnetic flux flow becomes imbalanced, a leaked magnetic flux increases, and as a result, an input/output voltage transformation ratio and measurement performance of the resolver deteriorate. However, in the existing techniques, this drawback is not reflected on the design of the resolver.

Further, in existing techniques, it is not proposed to optimize a lamination thickness relation between the stator and the rotor and reflect the area relation on the design of the resolver to facilitate the resolver designing work and reduce manufacture costs.

DISCLOSURE

Technical Problem

The present disclosure is designed to solve the problems of the related art, and therefore the present disclosure is directed to providing a resolver which may efficiently offset an influence caused by an assembly error, which is commonly generated when assembling the resolver, and also facilitate a resolver designing work and reduce manufacture costs.

Technical Solution

In one aspect of the present disclosure, there is provided a resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein a thickness (tr) of the rotor and a thickness (ts) of the stator satisfies Equation 1 below:

$$tr-ts \geq 0.7 \text{ [mm]}. \qquad \text{Equation 1}$$

In this case, the rotor or the stator may be a steel plate laminate formed by laminating steel plates of a predetermined thickness.

In another aspect of the present disclosure, there is also provided a resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein a thickness (tr) of the rotor and a thickness (ts) of the stator satisfies Equation 2 below:

$$0.7 \leq tr-ts \leq 0.95 \text{ [mm]}. \qquad \text{Equation 2}$$

In this case, the rotor or the stator may be a steel plate laminate formed by laminating steel plates of a predetermined thickness.

In an embodiment, an offset error (δ) in a thickness direction generated when assembling the rotor at a center in the stator may be 0.2 mm or below.

In an embodiment, a twist angle error (θ) in a direction of the rotary shaft generated when assembling the rotor at a center in the stator may be ±3° or below.

In an embodiment, the rotor may include a plurality of salient poles for changing a gap permeance in cooperation with the stator.

In an embodiment, the rotor may be compressively inserted into an end of a shaft of a motor assembled to an electric power steering device.

Advantageous Effects

According to the present disclosure, since a rotor is configured to have a lamination thickness greater than a lamination thickness of a stator to some extent, an influence caused by an assembly error, which is commonly generated when assembling a resolver, may be efficiently offset, and the measurement precision may be improved.

In addition, since a numerical range for optimizing a lamination thickness difference between the stator and the rotor is provided to be reflected on the design of the resolver, it is possible to prevent a design error and reduce manufacture costs.

Further, it would be obviously understood from the following description by those skilled in the art that various embodiments according to the present disclosure can also solve various technical objects not mentioned above.

DETAILED DESCRIPTION

Hereinafter, embodiments of the present disclosure will be described in detail with reference to the accompanying drawings in order to clearly explain solutions to the technical objects of the present disclosure. However, in the present disclosure, any explanation of the prior art may be omitted if it is regarded to render the subject matter of the present disclosure vague. Also, the terms used herein are defined in consideration of functions in the present disclosure and can be varied depending on the intention of a designer, a manufacturer or the like or according to custom. Therefore, the terms should be defined based on the overall disclosure of the specification.

Figure 1:
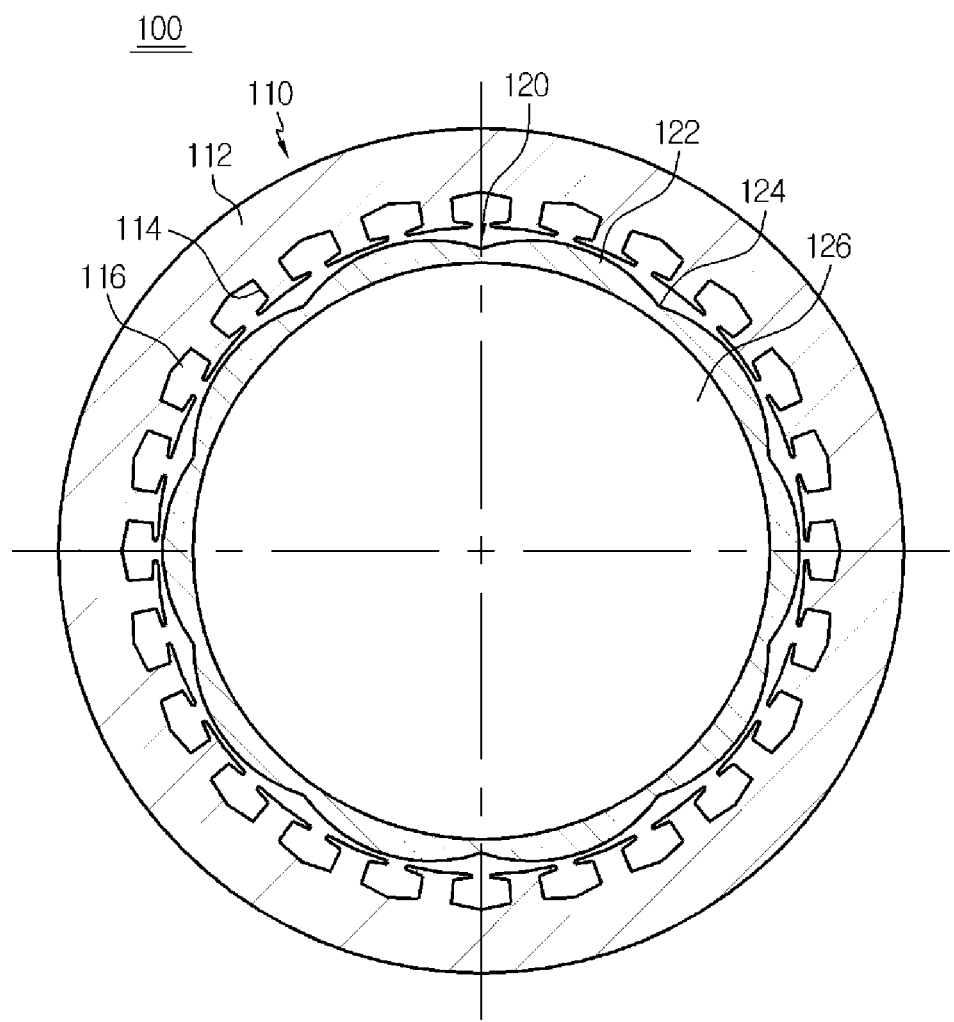
FIG. 1 is a horizontal sectional view showing an example of a resolver to which the present disclosure is applied.

FIG. 1 is a horizontal sectional view showing an example of a resolver to which the present disclosure is applied.

As shown in FIG. 1, a resolver 100 includes a stator 110 and a rotor 120. The stator 110 includes at least one excitation coil and at least one output coil. In other words, the stator 110 has an annular structure as a whole, and an excitation coil and an output coil (not shown) are disposed at an inner circumference thereof. The stator 110 may include an annular back yoke 112 configuring a body of the stator 110, and a plurality of teeth 114 protruding on an inner circumference of the back yoke 112. In this case, a plurality of slots 116 is formed between the teeth of the stator 110 to accommodate a coil, and the excitation coil and the output coil are respectively wound on the teeth 114 and disposed in the slots 116.

The rotor 120 has an annular structure as a whole and is disposed at the center space in the stator 110 with a predetermined gap from the stator 110 to change a gap permeance with respect to the stator 110 in cooperation with the stator 110 while rotating based on the rotary shaft. In this case, the rotor 120 may have a plurality of salient poles 122 to change a gap permeance in cooperation with the stator 110. In other words, the rotor 120 may include a plurality of salient poles 122 protruding in a radial direction at an outer circumference thereof and a connection portion 124 connecting the salient poles to each other. The rotor 120 may be compressively inserted into, for example, an end of a shaft of a motor assembled to an electric power steering device.

Meanwhile, if an excitation voltage is applied to the excitation coil disposed at the stator 110 and also the rotor 120 rotates based on the rotary shaft coupled to a center hole 126 thereof, the salient poles 122 of the rotor 120 rotate together to change a gap permeance between the stator 110 and the rotor 120 and resultantly change reluctance. As a result, voltage signals of sin and cos waveforms are output through the output coil of the stator 110. The resolver 100 measures a rotation angle, a rotation speed or the like of the rotary shaft by using these output signals.

Figure 2:
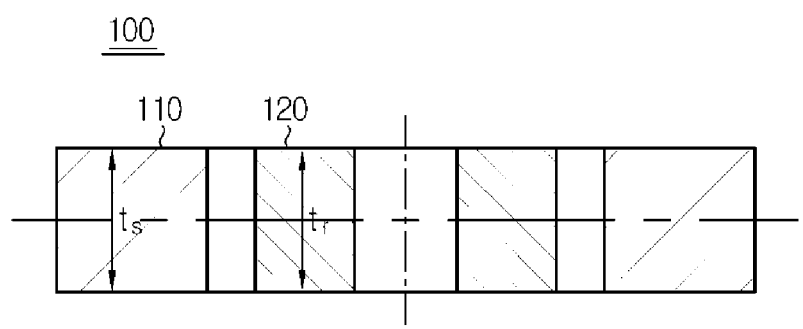
FIG. 2 is a vertical sectional view showing a general resolver in an ideal assembled state.

FIG. 2 is a vertical sectional view showing a general resolver in an ideal assembled state.

As shown in FIG. 2, the resolver 100 is generally designed so that a thickness (ts) of the stator 110 is identical to a thickness (tr) of the rotor 120. In addition, the stator 110 and the rotor 120 should be assembled to have the same installation location and inclination on the basis of a direction of the rotary shaft and to form a plane orthogonal to the rotary shaft. However, when the resolver is actually assembled, an error is generated at the installation locations and inclinations of the stator 110 and the rotor 120 due to an assembly tolerance.

Figure 3A:
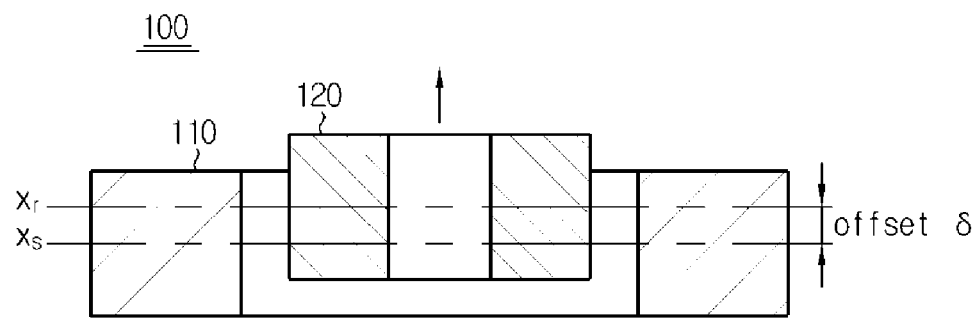
FIGS. 3a and 3b is a vertical sectional view showing an assembly error generated when actually assembling a resolver.
Figure 3B:
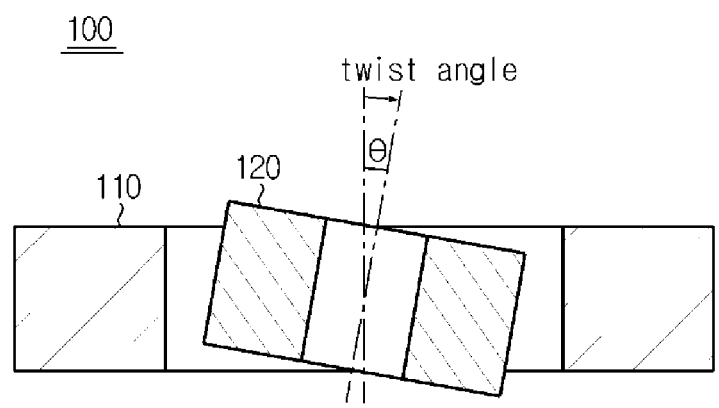

FIGS. 3a and 3b is a vertical sectional view showing an assembly error generated when actually assembling a resolver.

As shown in FIG. 3a, the stator 110 and the rotor 120 are independent components, which are fabricated separately and then assembled, and thus an offset error ($\delta$) is commonly generated so that physical central axes (xs, xr) of the stator 110 and the rotor 120 are distorted. Generally, the offset error ($\delta$) may be generated as much as 0.2 mm or below.

Also, as shown in FIG. 3b, when the stator 110 and the rotor 120 are assembled, the rotor 120 may be inclined with respect to the stator 110 to generate a twist angle error ($\theta$) by which the rotary shaft is not matched but inclined relatively. Generally, the twist angle error ($\theta$) may be generated as much as $\pm 3°$ or below.

If the offset error ($\delta$) or the twist angle error ($\theta$) is generated as above, a magnetic flux flow formed between the stator 110 and the rotor 120 may be imbalanced in a vertical or horizontal direction based on the direction of the rotary shaft, a leaked magnetic flux increases, thereby deteriorating an input/output voltage transformation ratio and measurement performance of the resolver. Therefore, in the present disclosure, by adjusting and optimizing a thickness relation between the stator and the rotor, an assembly error generated when assembling the resolver may be efficiently offset, and the measurement performance of the resolver is improved.

Figure 4:
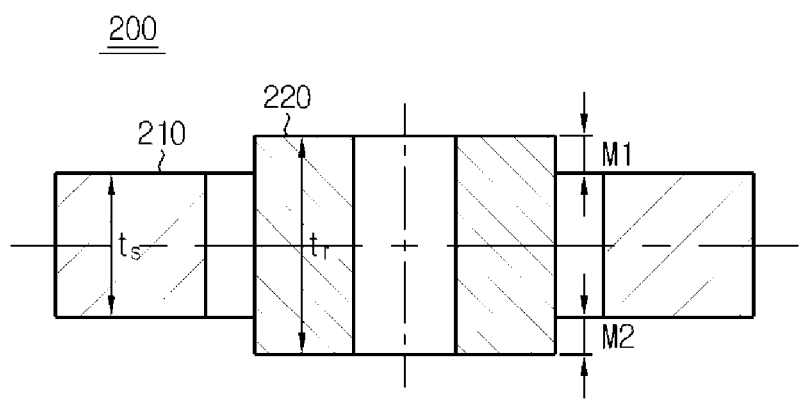
FIG. 4 is a vertical sectional view showing a resolver according to an embodiment of the present disclosure.

FIG. 4 is a vertical sectional view showing a resolver according to an embodiment of the present disclosure.

As shown in FIG. 4, a resolver 200 according to an embodiment of the present disclosure includes a stator 210 and a rotor 220. In other words, the stator 210 has an annular structure as a whole, and an excitation coil and an output coil are disposed at an inner circumference thereof. In addition, the rotor 220 has an annular structure as a whole and is disposed at a center space in the stator 210 with a gap of 0.4 mm to 1.5 mm from the stator 210 to rotate based on the rotary shaft. In this case, stator 210 와 rotor 220 may be made of a steel plate laminate formed by laminating a plurality of unit steel plates having a certain thickness and shape, in order to reduce an eddy current and this minimize a loss such as an iron loss. The unit steel plate may be formed with a ferromagnetic material having high magnetic permeability so that a great magnetic flux may be generated with a small current. The stator 210 and the rotor 220 may also be fabricated using a single steel plate of a predetermined thickness.

In the present disclosure, the thickness (tr) of the rotor 220 is greater than the thickness (ts) of the stator 210. In other words, during an assembling process, the rotor 220 is designed to be thicker than the stator 210 to some degree so that substantially the same overhang M1, M2 of the same thickness is generated at upper and lower ends of the stator 210. Therefore, the thickness or number of laminated unit steel plates used in the stator 210 and the rotor 220 may vary.

In addition, in this case, a lamination thickness difference (tr−ts) between the rotor 220 and the stator 210 may have a predetermined value equal to or greater than 0.7 mm. In other words, if the thickness (tr) of the rotor 220 is greater than the thickness (ts) of the stator 210 by 0.7 mm or above, even though an offset error (δ) or a twist angle error (θ) is generated in assembling the resolver, an input/output voltage transformation ratio of the resolver is maintained substantially consistently, and a maximum measurement error at the output of the resolver is maintained to be 0.5° or below, thereby improving the measurement performance of the resolver. In this case, a relation between the thickness (tr) of the rotor 220 and the thickness (ts) of the stator 210 may be set as in Equation 1 below.

$$tr-ts \geq 0.7 \text{ [mm]} \quad \text{Equation 1}$$

where tr represents a thickness of the rotor 220, and ts represents a thickness of the stator 210.

In addition, the thickness difference (tr−ts) between the rotor 220 and the stator 210 may have a predetermined value equal to or smaller than 0.95 mm. In other words, if the thickness difference (tr−ts) between the rotor 220 and the stator 210 is greater than 0.95 mm, the input/output voltage transformation ratio and the measurement performance of the resolver are not improved further even though a packing work becomes more difficult due to the structure of a product and manufacture costs increase, thereby deteriorating product marketability. Meanwhile, if the thickness difference (tr−ts) between the rotor 220 and the stator 210 is maintained to be equal to or smaller than 0.95 mm, a robust property of the resolver is ensured against the assembly error, a product may be easily mass-produced, and manufacture costs may be reduced. Therefore, it is desirable that the relation between the thickness (tr) of the rotor 220 and the thickness (ts) of the stator 210 satisfies Equation 2 below.

$$0.7 \leq tr-ts \leq 0.95 \text{ [mm]} \quad \text{Equation 2}$$

where tr represents a thickness of the rotor 220, and ts represents a thickness of the stator 210.

Meanwhile, the rotor 220 may be installed to generate overhangs M1, M2 having substantially identical or similar sizes at the upper and lower ends of the stator 210. In other words, In FIGS. 4, M1 and M2 may be identical or similar to each other. This is to prevent any imbalance of magnetic flux from being caused between the rotor 220 and the stator 210 due to an assembly tolerance. In other words, if the stator 210 and the rotor 220 satisfy the relation of Equation 1 or 2, even though an offset error (δ) or a twist angle error (θ) is generated between the stator 210 and the rotor 220 in assembling the resolver, an imbalance of magnetic flux may be prevented as much as possible, an input/output voltage transformation ratio of the resolver is maintained substantially consistently, and a maximum measurement error at the output of the resolver is maintained to be 0.5° or below.

The stator 210 of the resolver according to an embodiment of the present disclosure may be designed to have the thickness (ts) in the range of 3.5 mm to 10.5 mm. In other words, basically, if the thickness (ts) of the stator 210 decreases less than 3.5 mm, the magnetic flux path is narrowed, and this may result in overcrowding of the magnetic flux and makes it difficult to fabricate the resolver. Meanwhile, if the thickness (ts) of the stator 210 increases greater than 10.5 mm, the thickness (tr) of the rotor 220 should also be increased accordingly, and thus a size and weight of a product increase. For this reason, the thicknesses of the stator 210 and the rotor 220 increase relative to the gap between the stator 210 and the rotor 220, and thus the thicknesses may not be optimized easily by means of Equation 2.

Hereinafter, the effects of the present disclosure will be verified with reference to experiment results for the resolver measurement performance according to a lamination thickness difference between the rotor and the stator.

In this experiment, samples having a lamination thickness difference (tr−ts) between the rotor and the stator within the range of −0.7 mm to +0.95 mm were used. Experiment conditions were set have a test temperature of 24.5° C., an applied voltage of 7 Vrms, a frequency of 10 kHz, and a rotation speed of 60 rpm at the rotor, and other experiment conditions than the lamination thickness difference (tr−ts) were maintained consistently. In the experiment, the offset error (δ) was generated at intervals of 0.02 mm, up to 0.2 mm. In addition, in the experiment, the twist angle error (θ) was generated at intervals of 0.3°, up to 3°. The measurement error at the output side was calculated in comparison with a measurement value (a reference value) obtained using an encoder. In addition, a maximum allowable error of the resolver aimed in this experiment was set to be ±0.5°. This is because the resolver having measurement performance satisfying the maximum allowable error of ±0.5° may be applied to various precise control systems, thereby ensuring versatile application together with measurement precision.

FIGS. 5a to 5f are graphs showing a maximum measurement error and an input/output voltage transformation ratio according to an offset error (δ) in each case.

Figure 5A:
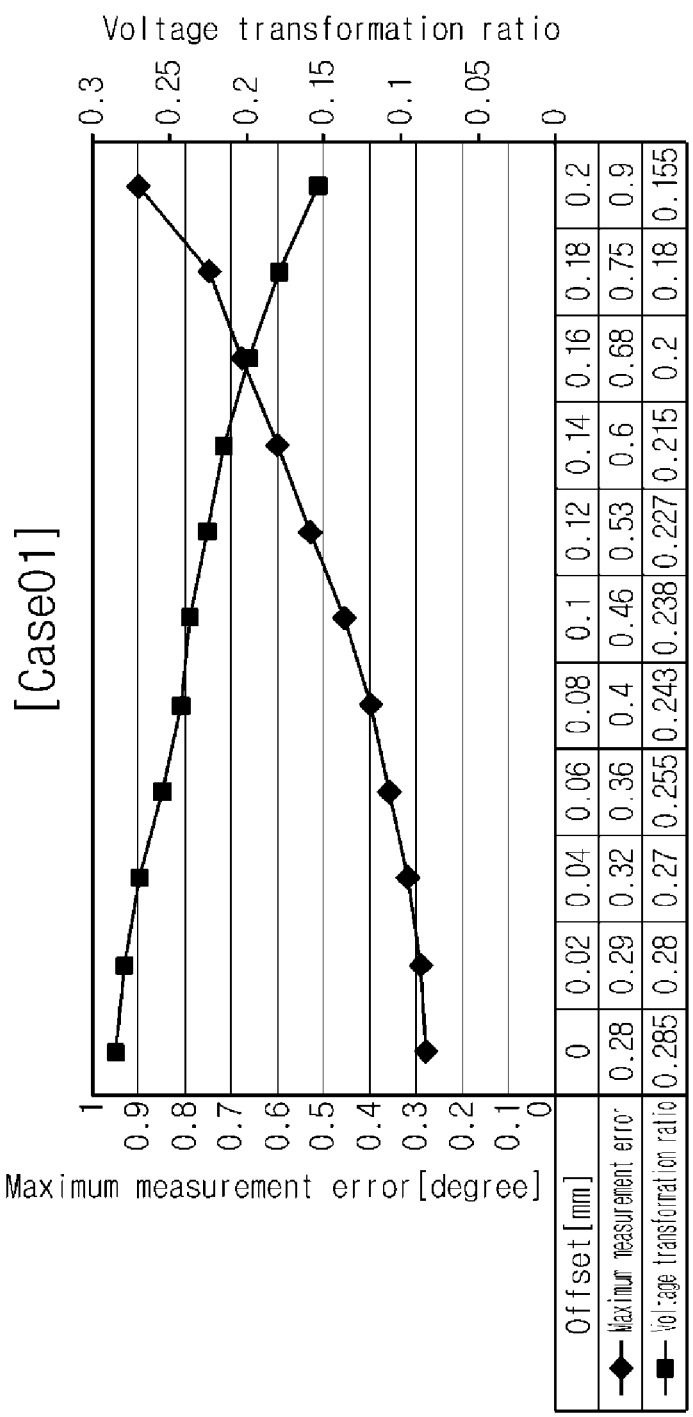
FIGS. 5a to 5f are graphs showing a maximum measurement error and an input/output voltage transformation ratio according to an offset error in each case.

When the thickness (tr) of the rotor is smaller than the thickness (ts) of the stator, namely when the thickness difference (tr−ts) between the rotor and the stator is −0.7 mm (Case 01), it may be found that as the offset error increases, the maximum measurement error abruptly increases up to 0.9°, and the voltage transformation ratio also decreases greatly in comparison to the original voltage transformation ratio, as shown in FIG. 5a.

Figure 5B:
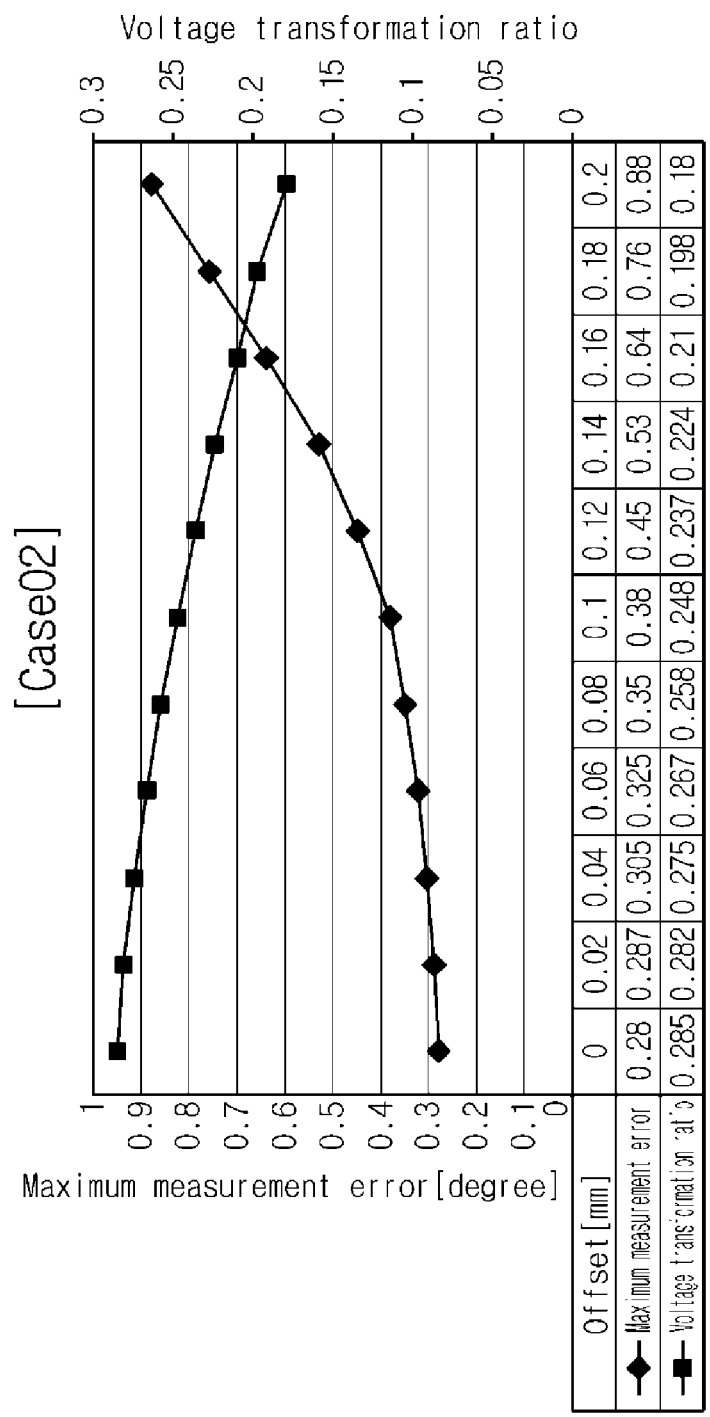

In addition, when the thickness difference (tr−ts) between the rotor and the stator is −0.35 mm (Case 02), it may be found that as the offset error (δ) increases, the maximum measurement error abruptly increases up to 0.88°, and the voltage transformation ratio also greatly decreases in comparison to the original voltage transformation ratio, as shown in FIG. 5b.

Figure 5C:
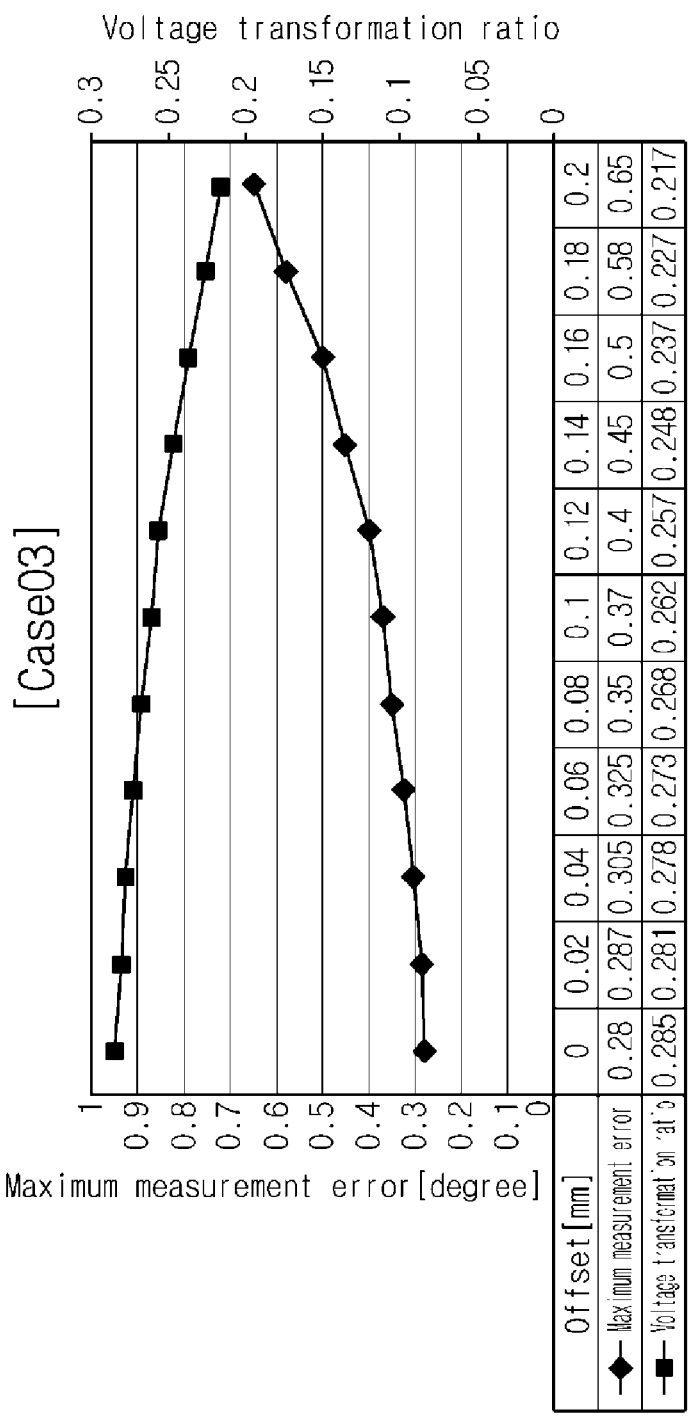

In addition, when the thickness difference (tr−ts) between the rotor and the stator is 0 mm (Case 03), namely when the thickness (tr) of the rotor is identical to the thickness (ts) of the stator, it may be found that as the offset error (δ) increases, the maximum measurement error still increases up to 0.65°, and the voltage transformation ratio also greatly decreases in comparison to the original voltage transformation ratio, as shown in FIG. 5c.

In other words, it may be understood that when the thickness of the rotor is smaller than or equal to the thickness of the stator, the measurement performance and the voltage transformation ratio of the resolver greatly decrease according to the occurrence of the twist angle error.

Figure 5D:
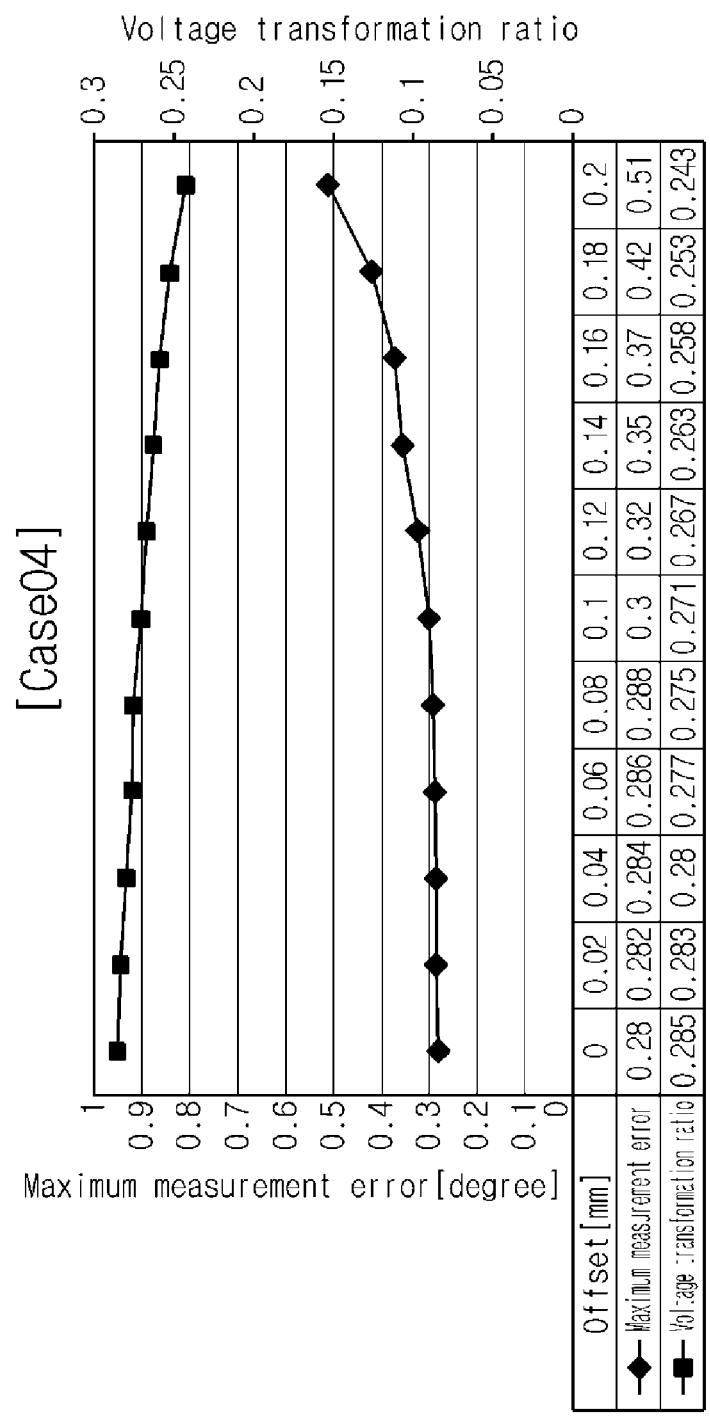

Meanwhile, when the thickness difference (tr−ts) between the rotor and the stator is 0.35 mm (Case 04), it may be found that even though the offset error (δ) increases, the maximum measurement error increases just up to 0.51°, and a change rate of the voltage transformation ratio is also greatly lowered, as shown in FIG. 5d.

Figure 5E:
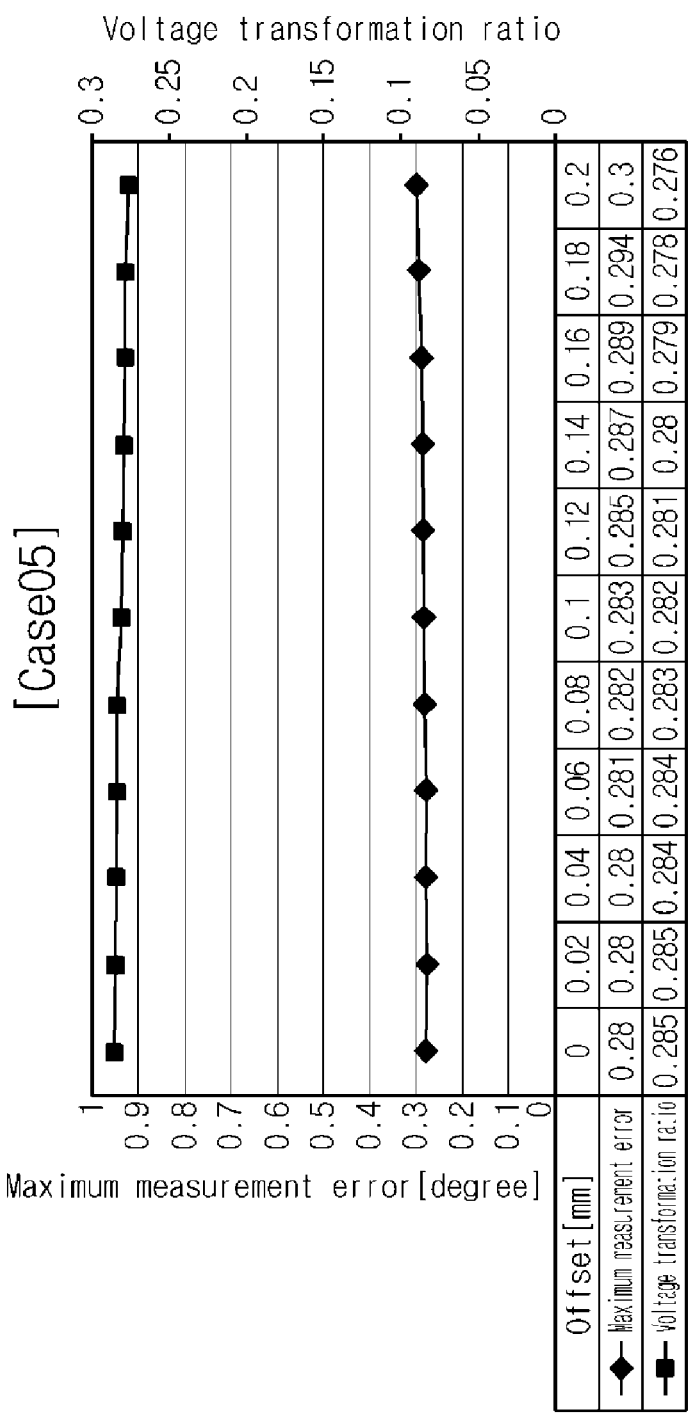

In particular, when the thickness difference (tr–ts) between the rotor and the stator is 0.7 mm (Case 05), it may be found that even though the offset error (δ) increases, the maximum measurement error is maintained just in the level of 0.3° to improve the measurement precision, and a change rate of the voltage transformation ratio is also negligible in a technical aspect, as shown in FIG. 5e.

Figure 5F:
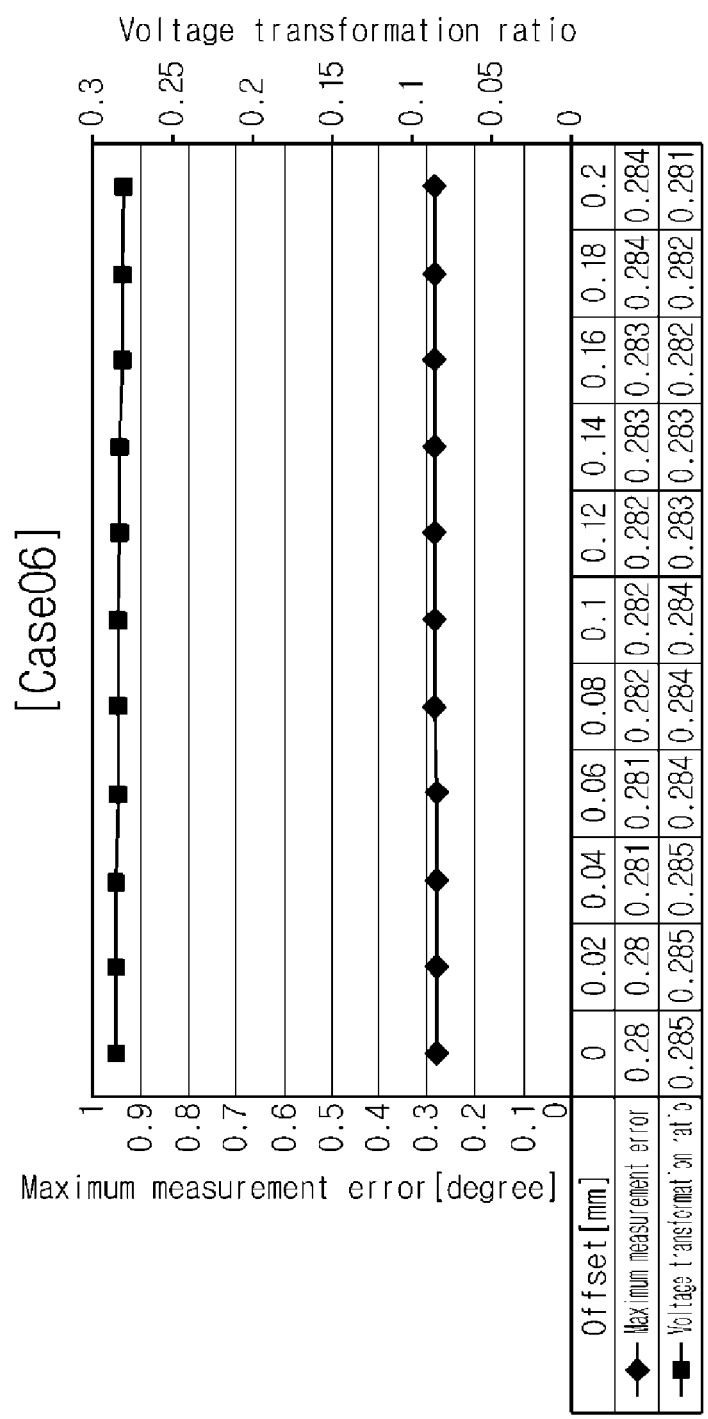

In addition, when the thickness difference (tr–ts) between the rotor and the stator is 0.95 mm (Case 06), it may be found that even though the offset error (δ) increases, the maximum measurement error is maintained just in the level of 0.284° to improve the measurement precision further, and a change rate of the voltage transformation ratio is also negligible in a technical aspect, as shown in FIG. 5f.

In other words, it may be understood that when the thickness of the rotor is greater than the thickness of the stator over a certain level (0.7 mm), the robust property of the resolver against the offset error and the measurement performance may be improved.

FIGS. 6a to 6f are graphs showing a maximum measurement error and an input/output voltage transformation ratio according to a twist angle error (θ) in each case.

Figure 6A:
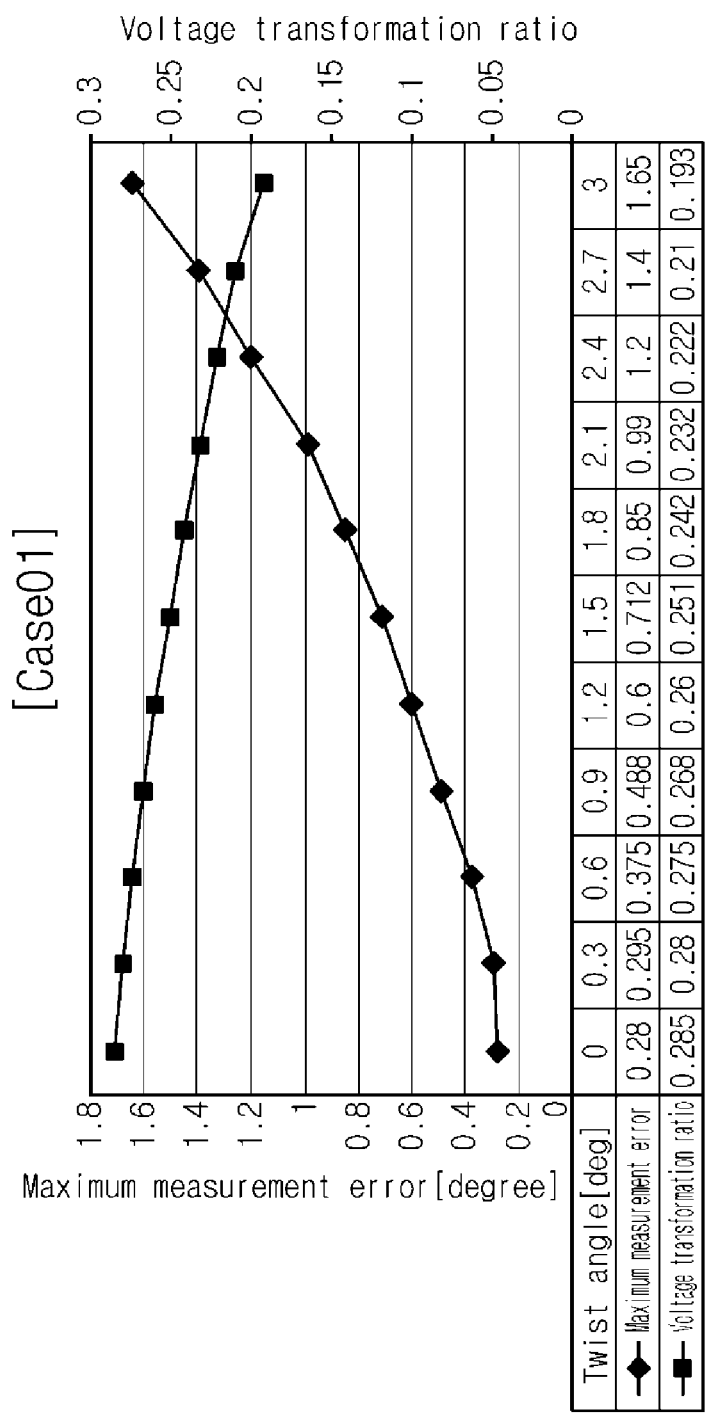
FIGS. 6a to 6f are graphs showing a maximum measurement error and an input/output voltage transformation ratio according to a twist angle error in each case.

When the thickness difference (tr–ts) between the rotor and the stator is –0.7 mm (Case 01), it may be found that as the twist angle error increases, the maximum measurement error abruptly increases up to 1.65°, and the voltage transformation ratio also greatly decreases in comparison to the original voltage transformation ratio, as shown in FIG. 6a.

Figure 6B:
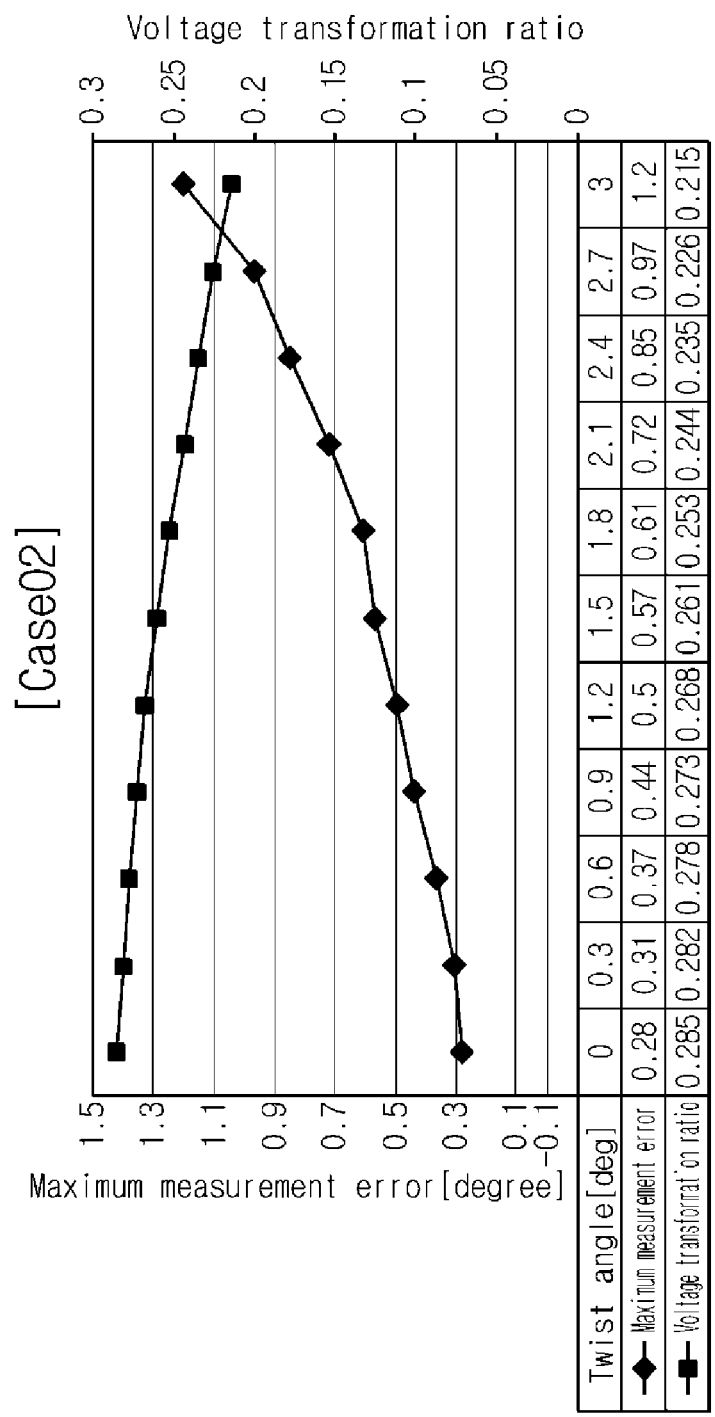

In addition, when the thickness difference (tr–ts) between the rotor and the stator is –0.35 mm (Case 02), it may be found that as the twist angle error increases, the maximum measurement error abruptly increases up to 1.2°, and the voltage transformation ratio also greatly decreases in comparison to the original voltage transformation ratio, as shown in FIG. 6b.

Figure 6C:
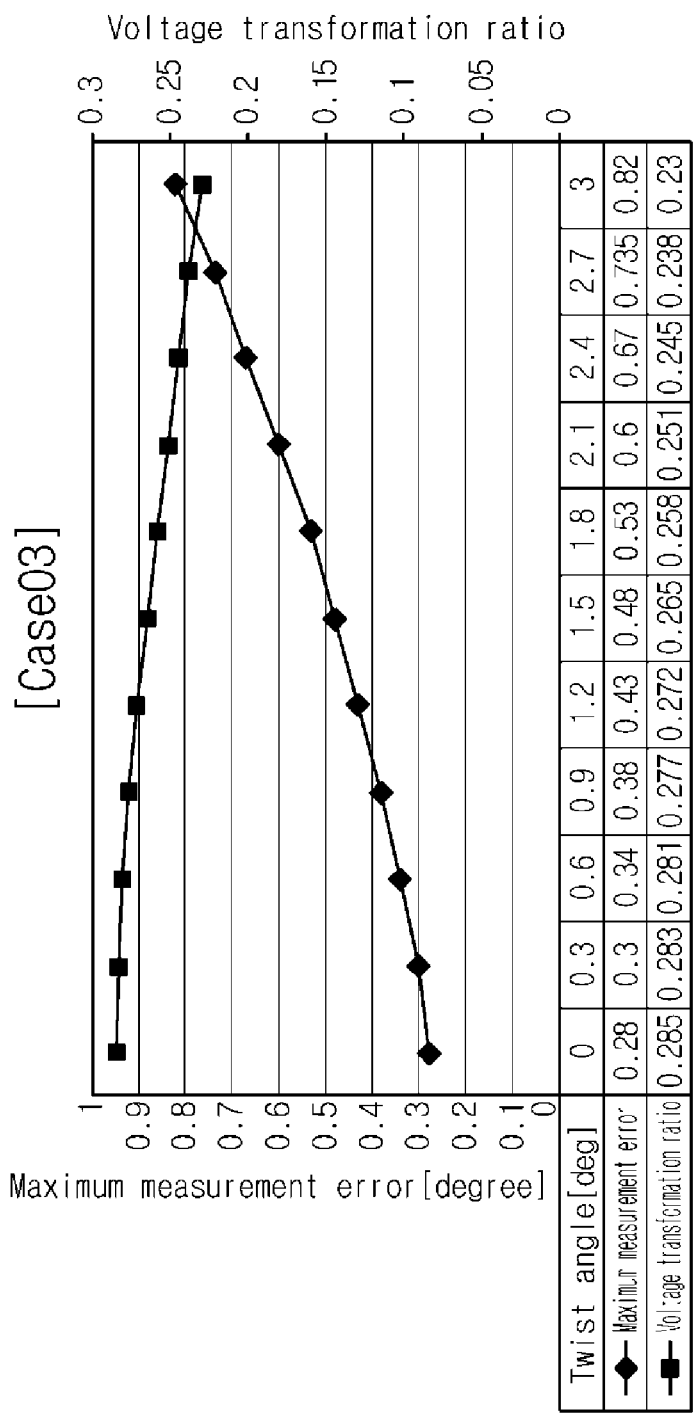

Moreover, when the thickness difference (tr–ts) between the rotor and the stator is 0 mm (Case 03), it may be found that as the twist angle error increases, the maximum measurement error still increases up to 0.82°, and the voltage transformation ratio also greatly decreases in comparison to the original voltage transformation ratio, as shown in FIG. 6c.

In other words, it may be understood that when the thickness of the rotor is smaller than or equal to the thickness of the stator, the measurement performance and the voltage transformation ratio of the resolver greatly decrease according to an occurrence of the twist angle error.

Figure 6D:
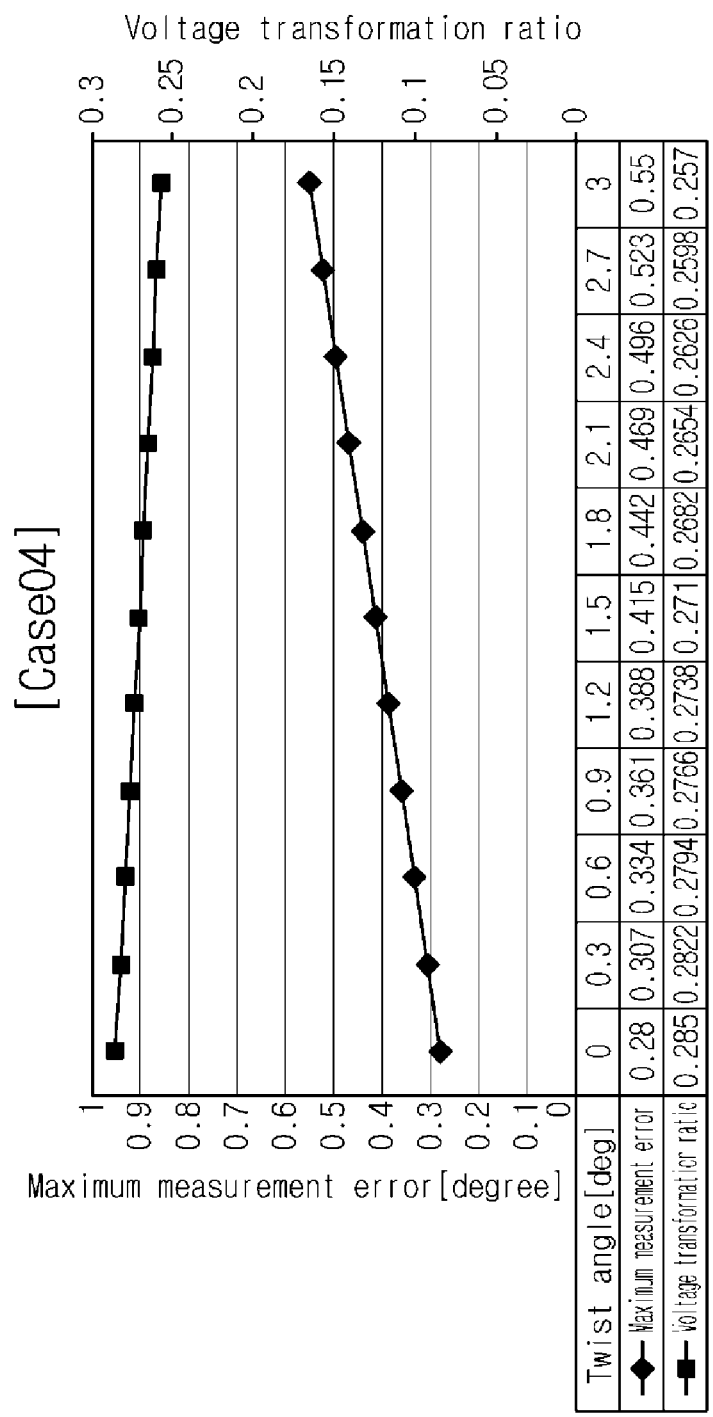

Meanwhile, when the thickness difference (tr–ts) between the rotor and the stator is 0.35 mm (Case 04), it may be found that even though the twist angle error increases, the maximum measurement error increases just to 0.55°, and a change rate of the voltage transformation ratio is also greatly lowered, as shown in FIG. 6d.

Figure 6E:
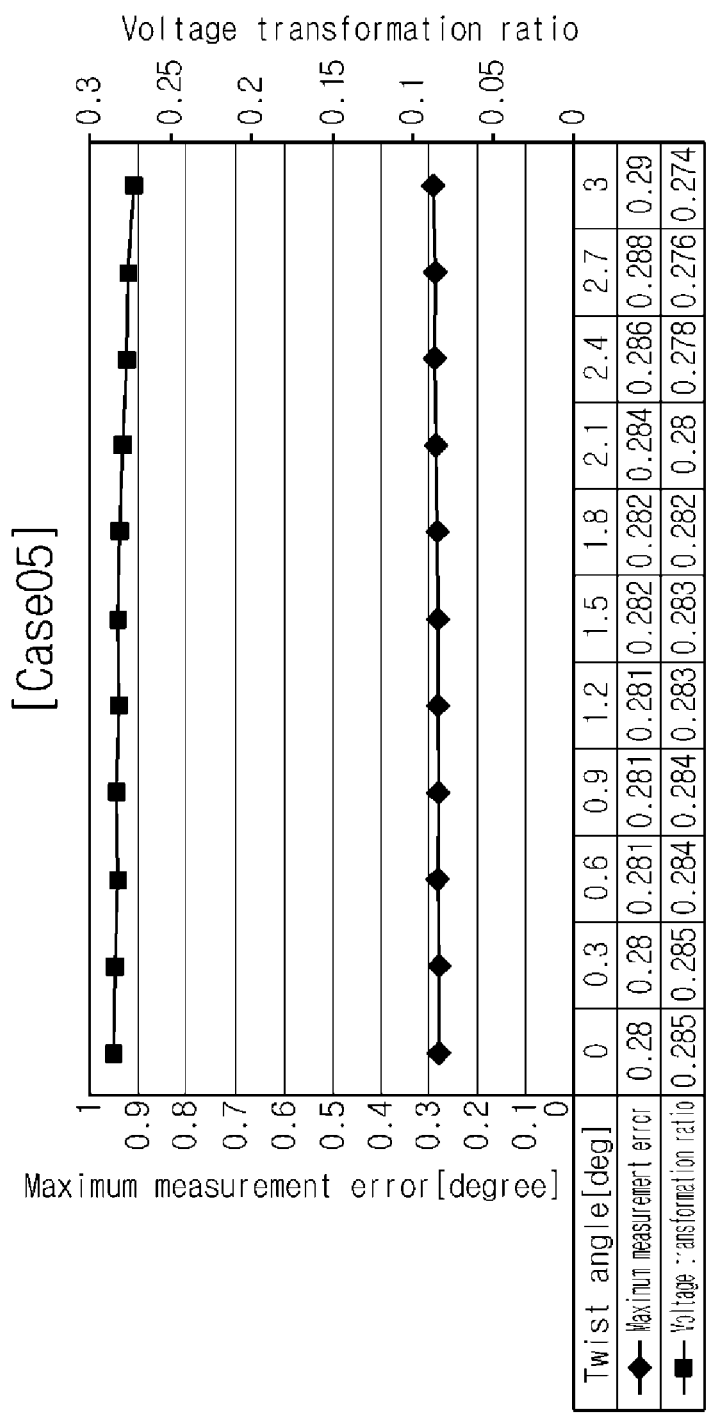

In particular, when the thickness difference (tr–ts) between the rotor and the stator is 0.7 mm (Case 05), it may be found that even though the twist angle error increases, the maximum measurement error is maintained just in the level of 0.29° to improve the measurement precision, and a change rate of the voltage transformation ratio is also negligible in a technical aspect, as shown in FIG. 6e.

Figure 6F:
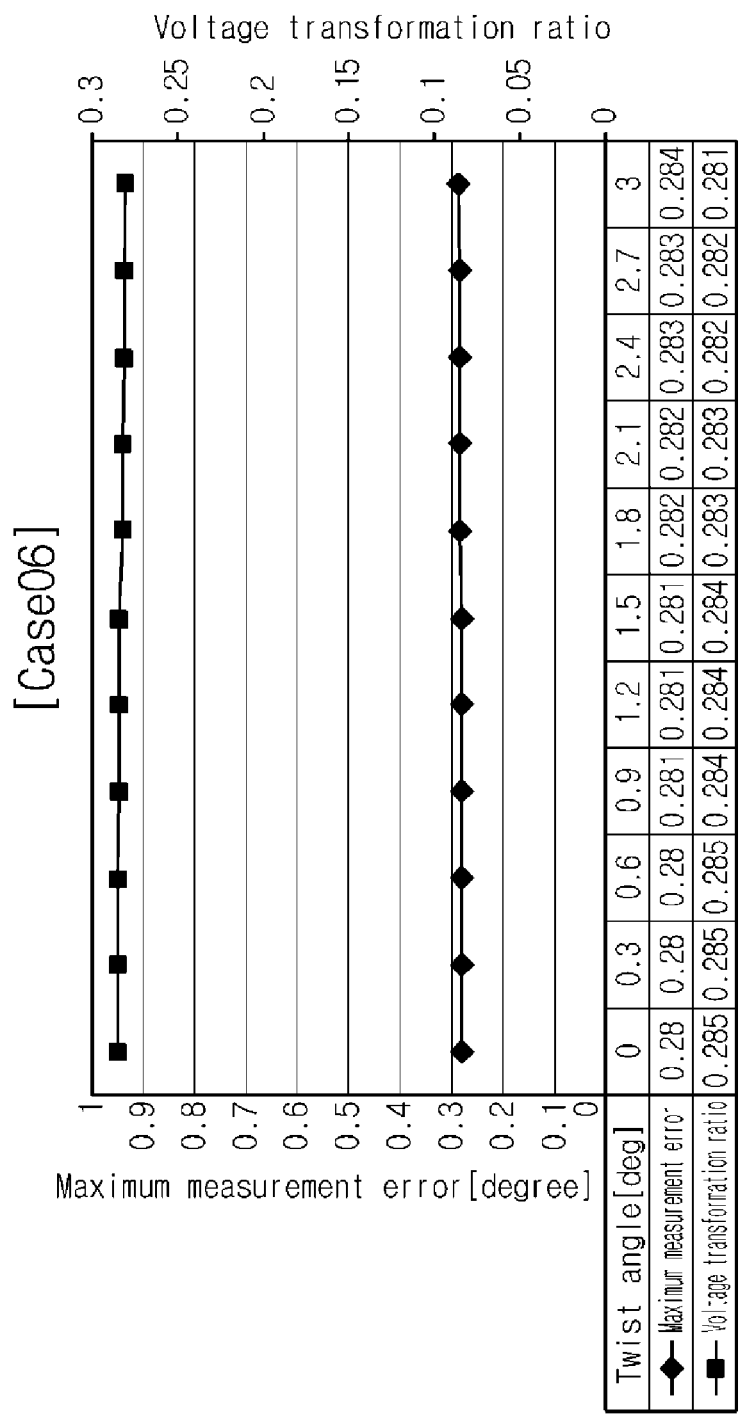

In addition, when the thickness difference (tr–ts) between the rotor and the stator is 0.95 mm (Case 06), it may be found that even though the twist angle error increases, the maximum measurement error maintained just in the level of 0.284° to improve the measurement precision further, and a change rate of the voltage transformation ratio is also negligible in a technical aspect, as shown in FIG. 6f.

In other words, it may be understood that when the thickness of the rotor is greater than the thickness of the stator over a certain level (0.7 mm), the robust property of the resolver not only against the offset error but also against the twist angle error and the measurement performance may be improved.

Figure 7:
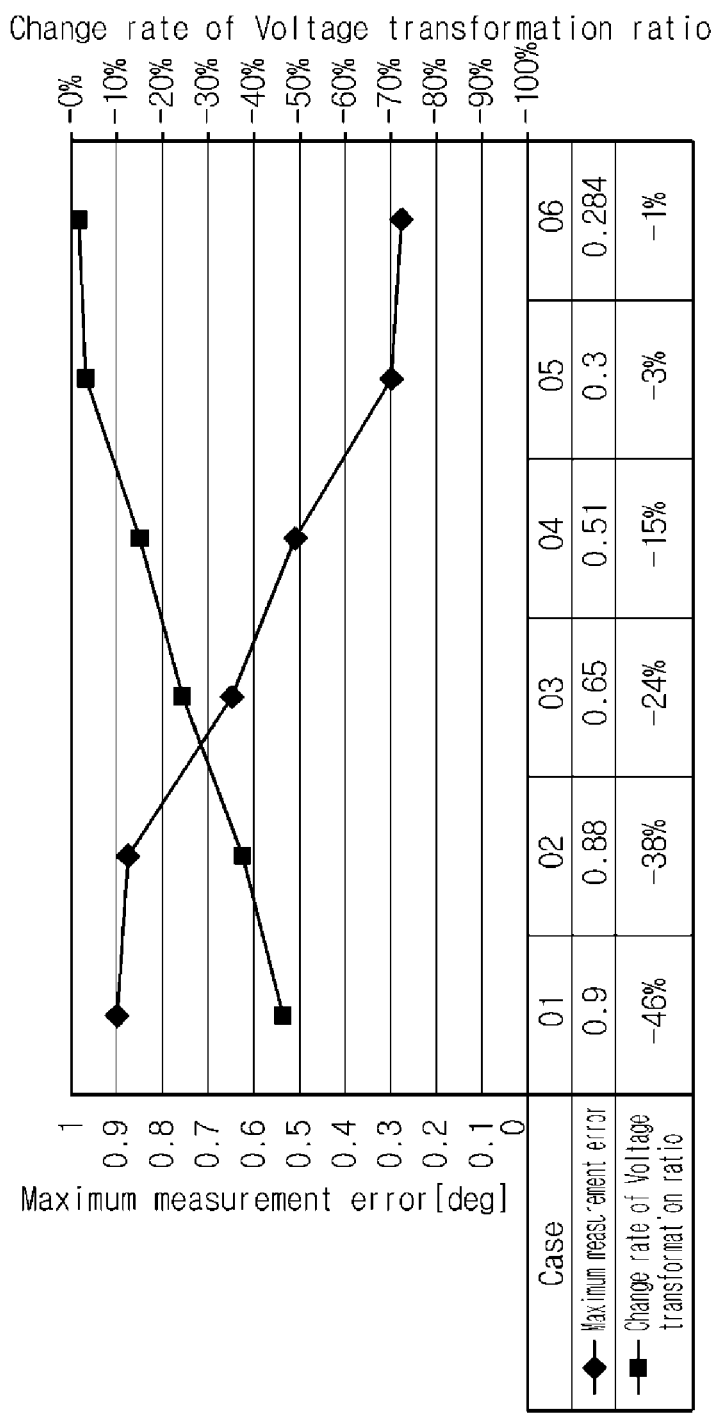
FIG. 7 is a graph showing a trend of a change rate of the maximum measurement error and the voltage transformation ratio according to an offset error in each case.

FIG. 7 is a graph showing a trend of change of the maximum measurement error and the voltage transformation ratio according to an offset error in each case.

As shown in FIG. 7, when the thickness difference (tr–ts) between the rotor and the stator is 0.7 mm or above (Case 05, Case 06), even though an offset error occurs, the maximum measurement error is maintained to be 0.3° or below to satisfy the allowable error range, and a change rate of the voltage transformation ratio is –3% or below, which is negligible. In addition, when the thickness difference (tr–ts) between the rotor and the stator is 0.95 mm (Case 06), even though an offset error occurs, the maximum measurement error is maintained to be 0.284° to improve the measurement performance further, and a change rate of the voltage transformation ratio is –1% below, which is negligible. However, if the thickness difference (tr–ts) between the rotor and the stator is greater than 0.95 mm, it may be understood that even though the thickness difference (tr–ts) increases, the measurement performance is not improved greatly.

Figure 8:
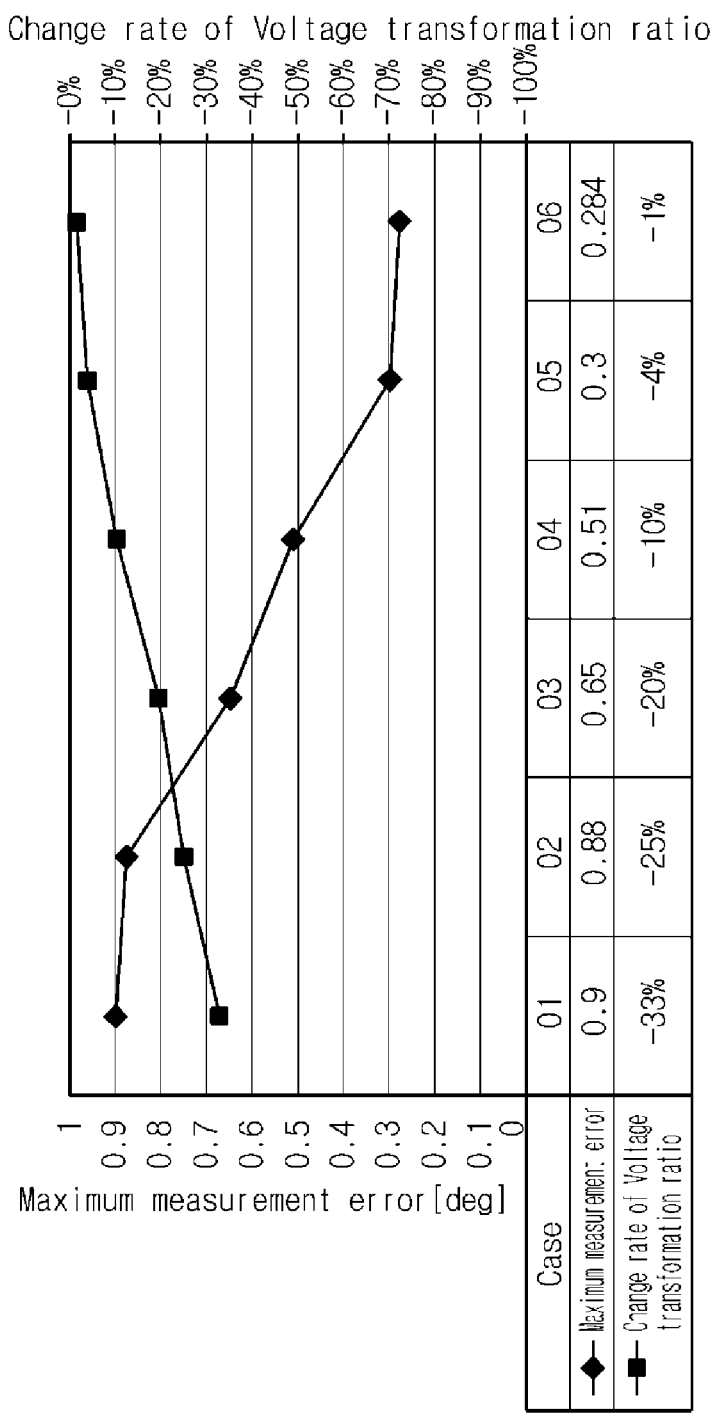
FIG. 8 is a graph showing a trend of a change rate of the maximum measurement error and the voltage transformation ratio according to a twist angle error in each case.

FIG. 8 is a graph showing a trend of change of the maximum measurement error and the voltage transformation ratio according to a twist angle error in each case.

As shown in FIG. 8, if the thickness difference (tr–ts) between the rotor and the stator is 0.7 mm or above (Case 05, Case 06), even though a twist angle error occurs, the maximum measurement error maintained to be 0.3° to satisfy the allowable error range, and a change rate of the voltage transformation ratio is –4% or below, which is negligible. In addition, when the thickness difference (tr–ts) between the rotor and the stator is 0.95 mm (Case 06), even though a twist angle error occurs, the maximum measurement error is maintained to be 0.284° to improve the measurement performance further, and a change rate of the voltage transformation ratio is –1% below, which is negligible. However, if the thickness difference (tr–ts) between the rotor and the stator is greater than 0.95 mm, it may be understood that even though the thickness difference (tr–ts) increases, the measurement performance is not improved greatly.

As described above, according to the present disclosure, since a rotor is configured to have a lamination thickness greater than a lamination thickness of a stator to some extent, an influence caused by an assembly error, which is commonly generated when assembling a resolver, may be efficiently offset, and the measurement precision may be improved. In addition, since a numerical range for optimizing a lamination thickness difference between the stator and the rotor is provided to be reflected on the design of the resolver, it is possible to prevent a design error and reduce manufacture costs. Further, various embodiments according to the present disclosure can also solve various technical objects not mentioned above.

Heretofore, the embodiments of the present disclosure have been described in detail. However, it will be clearly understood by those skilled in the art that various modifications can be made within the scope of the present disclosure. Therefore, the embodiments should not be interpreted restrictively but illustrative. In other words, the true scope of the present disclosure is defined in the appended claims, and its equivalents and modifications should be entirely considered as falling within the scope of the present disclosure.

What is claimed is:

1. A resolver, which includes a stator having an annular structure with a constant thickness and having at least one excitation coil and at least one output coil, and a rotor having an annular structure with a constant thickness and having a plurality of salient poles protruding in a radial direction at an outer circumference thereof, the rotor being disposed at a center space in the stator with a predetermined gap from the stator, the rotor rotating based on a rotary shaft to change a gap permeance with respect to the stator, wherein a thickness (tr) of the rotor and a thickness (ts) of the stator satisfies Equation 1 below:

$$tr-ts \geq 0.7 \text{ [mm]};  \quad \text{Equation 1}$$

wherein the rotor is installed to generate overhangs at upper and lower ends of the stator.

2. The resolver according to claim 1, wherein the rotor or the stator is a steel plate laminate formed by laminating steel plates of a predetermined thickness.

3. A resolver, which includes a stator having an annular structure with a constant thickness and having at least one excitation coil and at least one output coil, and a rotor having an annular structure with a constant thickness and having a plurality of salient poles protruding in a radial direction at an outer circumference thereof, the rotor being disposed at a center space in the stator with a predetermined gap from the stator, the rotor rotating based on a rotary shaft to change a gap permeance with respect to the stator, wherein a thickness (tr) of the rotor and a thickness (ts) of the stator satisfies Equation 2 below:

$$0.7 \leq tr-ts \leq 0.95 \text{ [mm]}; \quad \text{Equation 2}$$

wherein the rotor is installed to generate overhangs at upper and lower ends of the stator.

4. The resolver according to claim 3, wherein the rotor or the stator is a steel plate laminate formed by laminating steel plates of a predetermined thickness.

5. The resolver according to claim 1, wherein an offset error ($\delta$) in a thickness direction generated when assembling the rotor at a center in the stator is 0.2 mm or below.

6. The resolver according to claim 1, wherein a twist angle error ($\theta$) in a direction of the rotary shaft generated when assembling the rotor at a center in the stator is ±3° or below.

7. The resolver according to claim 5, wherein a twist angle error ($\theta$) in a direction of the rotary shaft generated when assembling the rotor at a center in the stator is ±3° or below.

8. The resolver according to claim 7, wherein the rotor is compressively inserted into an end of a shaft of a motor assembled to an electric power steering device.

* * * * *